July 7, 1931.   J. ROBERTSON   1,813,770
CLUTCH MECHANISM
Filed May 12, 1930

Inventor
JAMES ROBERTSON
By Frederick E. Bromley
Attorney.

Patented July 7, 1931

1,813,770

UNITED STATES PATENT OFFICE

JAMES ROBERTSON, OF PEACE RIVER, ALBERTA, CANADA

CLUTCH MECHANISM

Application filed May 12, 1930. Serial No. 451,729.

The invention relates to improvements in clutch mechanism as described in the present specification and shown in the accompanying drawings which form part of the same.

The invention appertains in particular to a transmission in which the changing of speeds is accomplished by the conventional selective gearing and has for its object to produce a transmission of this class in which the gears are constantly in mesh. More particularly the invention comprehends the novel design of locking members for engaging a gear with its shaft. A distinctive feature resides in the provision of guiding member for aligning lugs with recesses in the gears.

Referring to the drawings, Figure 1 illustrates a fragmentary view of a transmission depicting two of the customary set of change-speed-gears borne by the main shaft, and to which the present invention is shown applied.

Like numerals of reference indicate corresponding parts in each of the figures throughout the drawings.

Figure 1:
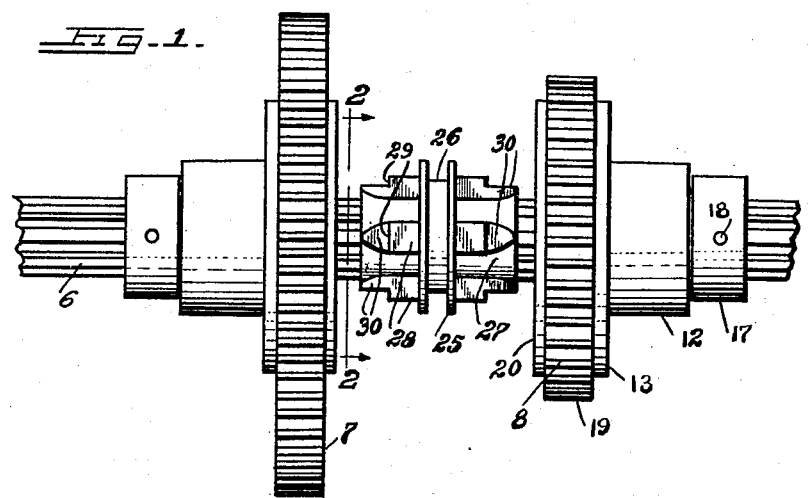
Figure 2:
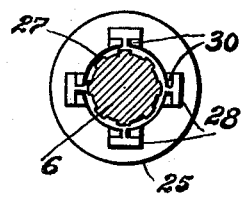
Figure 2 is a section of the main shaft and also an end view of a clutch member, which view is taken on the line 2—2 of Figure 1.
Figure 3:
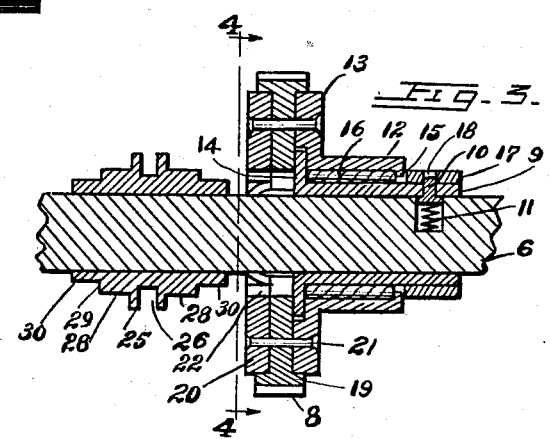
Figure 3 is a longitudinal section of the right-hand gear and the clutch member together with the shaft.
Figure 4:
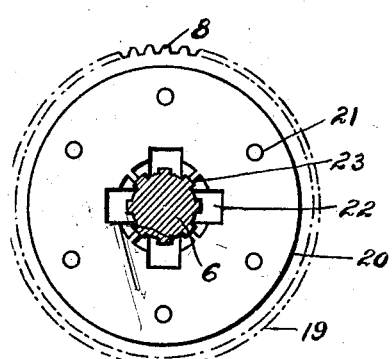
Figure 4 is a side elevation of this gear together with a section of the shaft, which view is taken on the line 4—4 of Figure 3.
Figure 5:
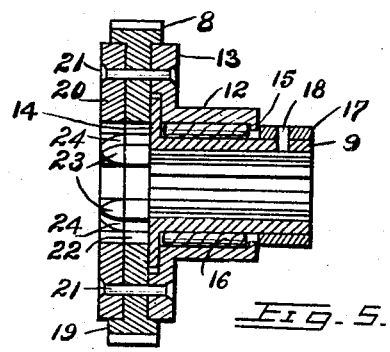
Figure 5 is a further section of this gear omitting the shaft.

The reference numeral 6 generally denotes the main shaft which is splined as usual. 7 and 8 are gears mounted thereon and constantly meshed with gears borne by the countershaft which is not shown as it does not form a part of the present invention. Since these gears are of identical construction a description of one will suffice for both.

9 denotes an inner race of an antifriction bearing, which race is fluted to fit the splines of the main shaft 6 and held against axial movement by means of a stud 10 lodged in an opening in the shaft and spring urged by a compression spring 11. The outer end of this stud is reduced and fitted in an opening in the inner race. By this construction it will be readily seen that by depressing the stud the inner race can be released.

12 is the outer race of the bearing, which has a flange 13 recessed to receive a flange 14 of the inner race, which constitutes a shoulder for one end of the bearing.

The opposite end of the outer race is provided with an annular shoulder 15 which projects inwardly of its bore so as to retain the antifriction members 16 in the bearing. The antifriction members are shown by way of example as being composed of roller bearings. 17 is a collar or spacer encircling the inner race and locked thereon, such as by means of the opening 18 in which the reduced end of the stud 10 is fitted. This collar serves to retain the outer race in place and may also be used as a spacer between two adjacent gears if so desired.

19 is a spur gear fitted to the flange 13, and 20 is a plate fitted to the outer face of said gear. Both the plate and the gear are fixed to the flange 13, preferably by rivets 21. While the gear and the plate are shown as separate members attached to the outer race of the bearing it is to be distinctly understood that if so desired they can be formed in one piece with the outer race without departing from the invention. Both the plate 20 and gear 19 are provided with recesses 22, preferably four in number as shown and spaced equidistantly therearound. The plate 20 is provided with guiding members 23 situated intermediate of the recesses, which guiding members are rounded off as at 24 in the form of blunt noses and have their sides merged into the recesses as shown.

25 generally denotes a clutch member provided with an annular groove 26 to receive the conventional shifter fork. The clutch member comprises a sleeve 27 slidably mounted on the main shaft 6 and is held against independent rotation by means of flutes receiving the splines of the shaft.

28 are locking lugs constructed integral with the sleeve and extending axially thereof, which locking lugs have blunt end faces as at 29 and are spaced equidistantly around the sleeve for engagement in the recesses 22.

Projecting in advance of each locking lug is a guide member as at 30 which has rounded off sides constituting a blunt nose for engagement with the guide members 23. It is preferable to make the guiding members of the clutch element of a lesser thickness than the locking lugs and to correspondingly make the guiding lugs 23 of a lesser depth than the recesses 22.

By this construction it will be readily understood that by sliding the clutch member along the shaft towards the gear 19 the guide members 30 will first engage the guiding members 23 and thus bring the driving lugs into engagement with the said recesses in order to establish a driving action between the gear and the main shaft 6.

Whereas the clutch member has been shown and described as slidably mounted on the main shaft it will be understood by those skilled in the art that if so desired it could be formed integral therewith and the shaft itself slid axially in order to bring the driving lugs into locking engagement with the recesses, or, if so desired, the gears could be arranged to be slid along the shaft and the clutch member held stationary to accomplish the same result.

What I claim is:—

A clutch mechanism comprising a splined shaft, an inner race fitted thereon, a stud lodged in an opening in the shaft and having a reduced end projecting into an opening in the inner race, a spring retaining said reduced end in its opening, an outer race, anti-friction members interposed between said races, flanges preventing the outer race from shifting axially, a gear fixed to said outer race, a plate fixed to said gear, recesses provided in said plate and said gear, guiding elements interposed between said recesses, a clutch element slidably mounted on said shaft and held against independent rotation by flutes, locking lugs borne thereby, and guiding elements forwardly projecting therefrom for engagement with the aforesaid guiding elements to align the locking lugs with the aforesaid recesses.

Signed at the town of Peace River in the Province of Alberta, Canada, this 22nd day of April, 1930.

JAMES ROBERTSON.